United States Patent
Schiess et al.

[19]

[11] Patent Number: 5,980,177
[45] Date of Patent: Nov. 9, 1999

[54] FASTENER

[76] Inventors: Jennifer E. Schiess, 728 Medford Dr., Rockford, Ill. 61107; Harry M. Travis, 419 E. Madison, Milton, Wis. 53563

[21] Appl. No.: 09/041,875

[22] Filed: Mar. 12, 1998

[51] Int. Cl.[6] ............................. F16B 39/22; F16B 37/16
[52] U.S. Cl. .......................... 411/299; 411/418; 411/437; 411/941.1
[58] Field of Search ..................................... 411/299, 300, 411/418, 420, 433, 437, 551, 552, 553, 941.1, 941.3

[56] References Cited

U.S. PATENT DOCUMENTS 1,451,970 4/1923 Taylor ...................................... 411/418
2,342,170 2/1944 Tinnerman ........................... 411/418 X
2,730,154 1/1956 Aspey ................................... 411/553 X
3,255,796 6/1966 Tobey ................................... 411/199 X

*Primary Examiner*—Neill Wilson
*Attorney, Agent, or Firm*—Keith Frantz

[57] ABSTRACT

A fastener includes a threaded post and a nut formed with an internal threaded portion for threading onto the rod. A slot formed longitudinally in the post interrupts the threads and that is sized to slidably receive the threaded portion of the nut such that the nut slides freely along the length of the post. The nut is secured by sliding the nut onto the post until reaching a desired position, and then rotating the nut such that the threaded portion of the nut engages the threads formed on the post. The nut is secured into the desired position with an integrally formed locking tab that extends into the slot after the nut has been rotated onto the shank.

12 Claims, 4 Drawing Sheets

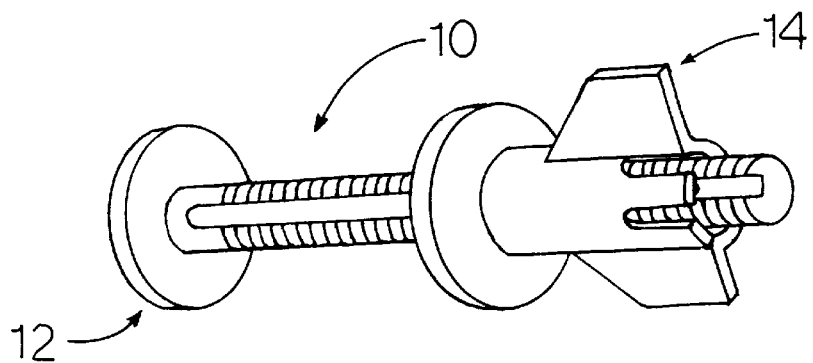
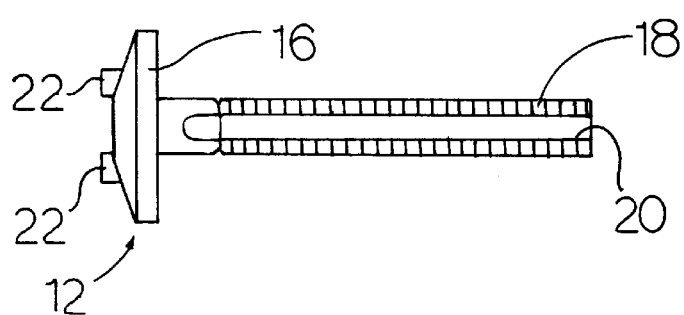
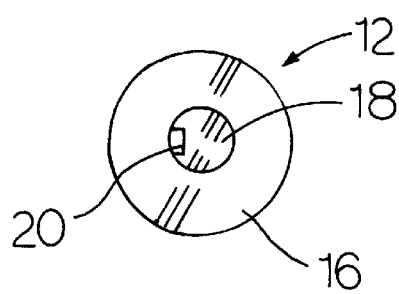
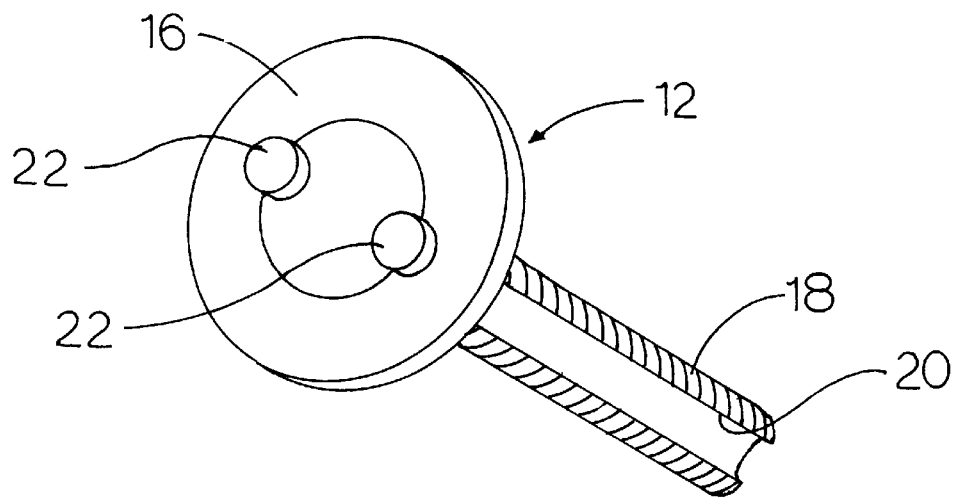

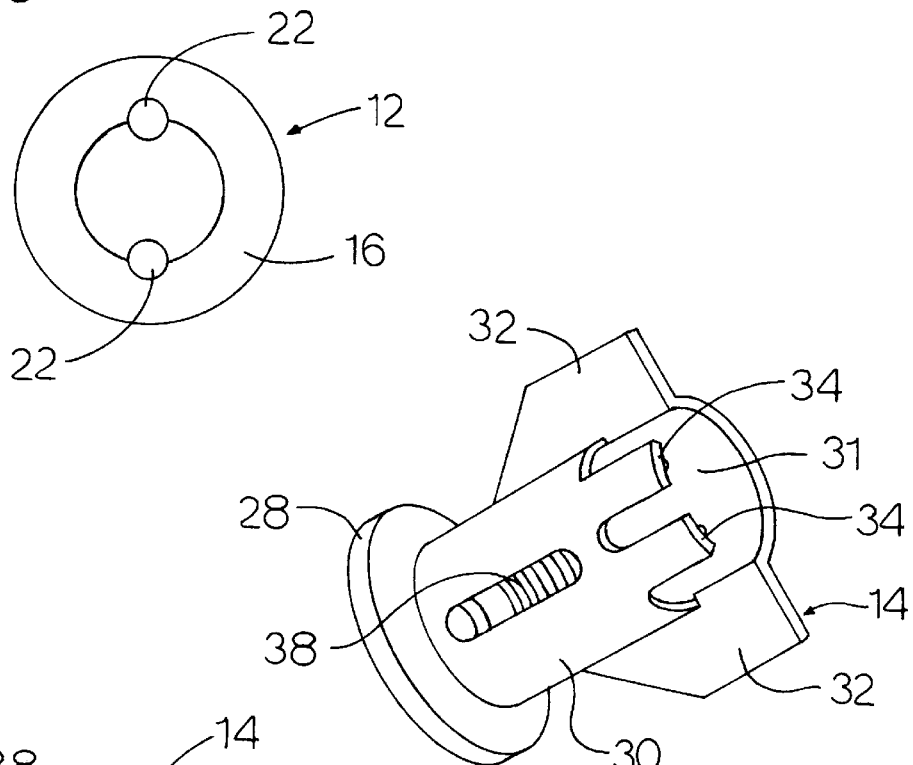
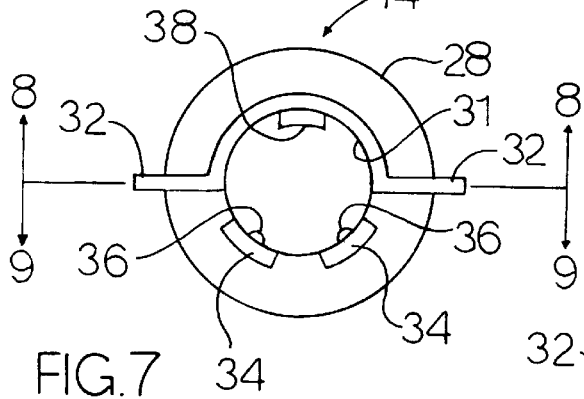
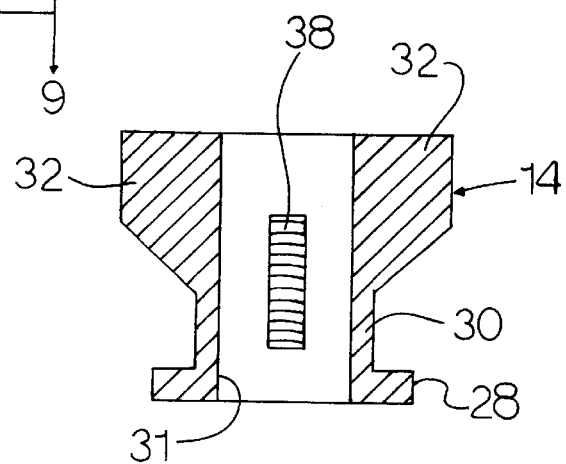

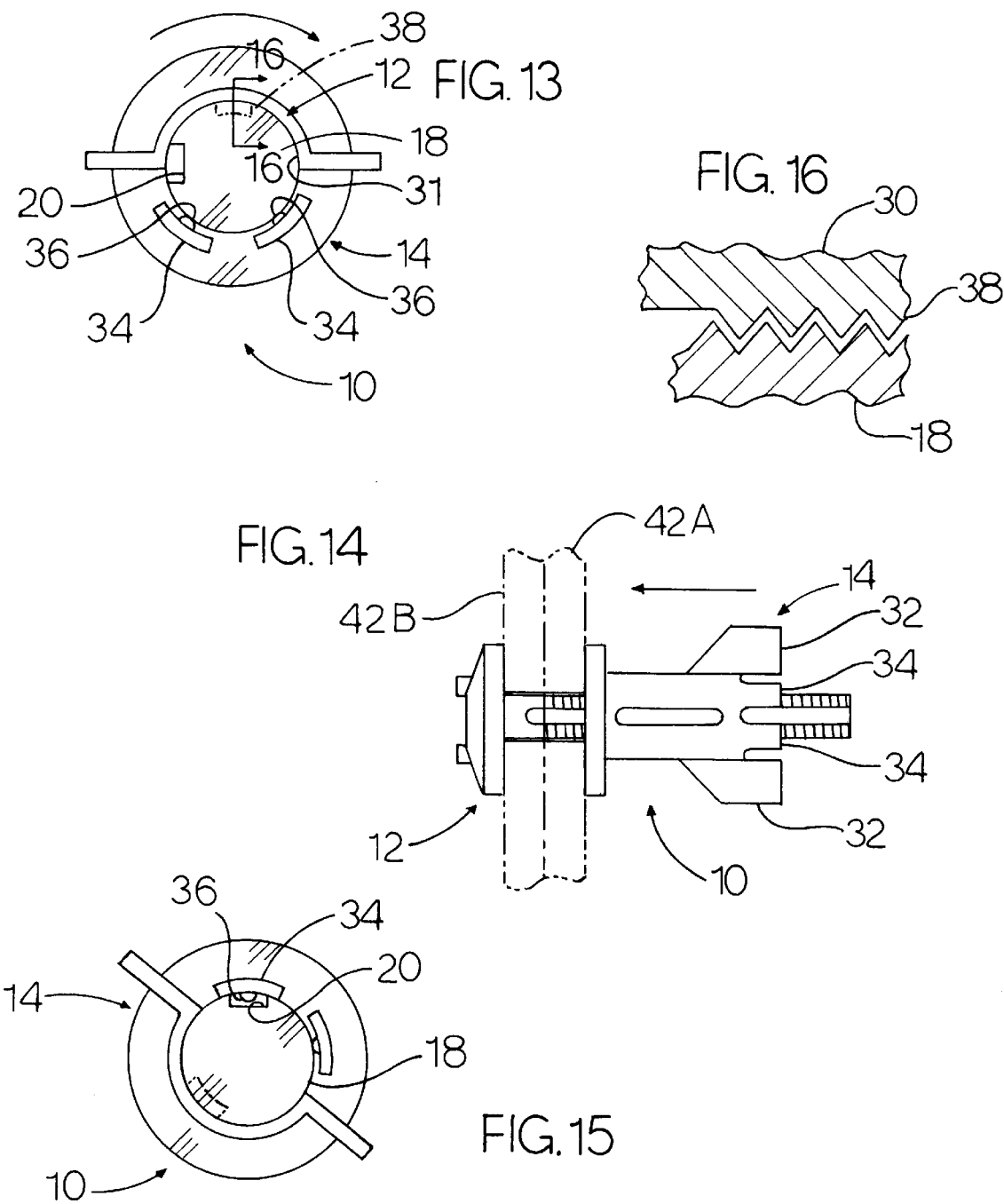

FASTENER

CROSS-REFERENCE TO RELATED APPLICATIONS

Not Applicable.

STATEMENT REGARDING FEDERALLY SPONSERED RESEARCH OR DEVELOPMENT

Not Applicable.

REFERENCE TO A "MICROFICHE APPENDIX"

Not Applicable.

BACKGROUND OF THE INVENTION

1. Field of the Invention

The present invention relates generally to two-part reusable fasteners, and more particularly to quick-connect/release, self-locking fasteners.

2. Description of the Related Art

A multitude of reusable fasteners are known and commercially available for releasably connecting two or more members together. Typical fasteners of this general type include the conventional threaded nuts and bolts. And while power tools are available to rotate a nut onto a threaded bolt relatively quickly, manually turning the nut can be inconvenient and time consuming, and thus expensive in certain manufacturing operations.

Numerous prior two-part push-on type fasteners have been developed to increase the speed of manual assembly and disassembly. One such fastener arrangement commonly known as a bayonet connector is quickly assembled by inserting one part of the connector into an opening formed in the other part of the connector, and then turning one or both of the parts through an angle of rotation to effect engagement between a pin connected to one of the parts and a slot formed in the other part. Bayonet connectors or similar fasteners, however, are adapted for use with members of a particular thickness, and the same fastener can not securely hold members of different thickness.

Other quick-connect/release fastener arrangements that are adapted to accommodate members of different thickness are disclosed in Bailet et al. U.S. Pat. No. 4,369,012, Hutchinson, U.S. Pat. No. 5,113,553, and Anderson, U.S. patent application Ser. No. 08/846,320. In general, these fasteners may be assembled by simply pushing the two parts of the fastener together, and in the instance of Hutchinson, then rotating one of the parts. However, in each of these instances, (except in one embodiment of Bailet discussed below) the fasteners are basically adapted to trap the members together, and in some instances can achieve a snug fit with the members, but are not specifically adapted to insure a snug fit with members of different thickness.

Still other quick-connect/release fastener arrangements that are adapted to accommodate members of different thickness are disclosed in Schaeffer U.S. Pat. No. 2,118,361, and in one embodiment in Bailet et al. U.S. Pat. No. 4,369,012. Such fasteners include a nut member having opposing nut portions that are threaded for connection to a threaded rod to effect a snug fit against the members being connected together, and that are resiliently connected such that the threaded portions can be manually separated and simply slipped onto the threaded rod in close proximity with the members before turning the nuts to secure the members together. However, in these instances, the need to hold and squeeze the nut portions together in order for the nut to slip over the threaded rod is not conducive to machine or automated assembly techniques. In addition, provision must be made in one of the members being secured by such fasteners to snugly receive the nose of the nut portions so as to prevent the nut portions from separating when the nuts are tightened against the members. Moreover, neither of these fastener arrangements are adapted to insure that the nut does not inadvertently back off of the threaded rod such as from vibration of the assembled parts, and thus are not suitable for securing parts in a dynamic environment such as is encountered in automotive or marine applications.

Thus, there is an ever present need for a fastener that provides the ability to secure members of different thickness together manually more quickly and easily than with conventional nuts and bolts, that is equally suitable for manual and automated operation, and that is simultaneously adapted to be self-locking.

BRIEF SUMMARY OF THE INVENTION

The general aim of the present invention is to provide a new and improved reusable threaded fastener that is more quickly and easily installed when compared to prior fasteners of the same general type, and that may be removed as quickly and easily as it is installed.

A detailed objective of the invention is to achieve the foregoing by providing a fastener that can be assembled by simply slipping a nut onto a threaded rod or post, and that is then secured in place by turning the nut through a rotation of less than 360 degrees.

Another aim of the invention is to provide such a fastener that is hand-operable, and that is equipped with a self-actuating mechanism that automatically locks the nut in position after it has been manually rotated on the threaded post.

These and other objectives and advantages of the invention will become more apparent from the following detailed description when taken in conjunction with the accompanying drawings.

In general, the threaded post is formed with a longitudinally extending slot that extends from the free end of the post and along the length of the post so as to form a key way arrangement that interrupts the circumferentially extending threads in the post. The nut is then formed with a central opening sized to slidably receive the threaded post, and a threaded tab that is sized to be slidably received in the slot and sized for threaded engagement with the threaded post.

With this arrangement, the nut is positioned on the post by simply aligning the threaded tab with the slot, and then sliding the nut along the length of the post to the desired position such as sung against the members that are to be secured together. The nut is then secured into position on the post and against the members by simply turning the nut to a desired position or preload condition.

In the preferred embodiment, the nut includes a locking tab that is sized to be slidably received into the slot as the nut is rotated through a predetermined angular rotation, and that is resiliently biased toward the slot for automatic locking engagement with the slot when the locking tab is aligned with the slot. Wing members extending outwardly from the nut are provided for ease of manual rotation of the nut.

BRIEF DESCRIPTION OF THE SEVERAL VIEWS OF THE DRAWINGS

FIG. 1 is a rear perspective view of a new and improved self-locking fastener incorporating the unique features of the present invention.

FIGS. 2 and 3 are orthogonal side elevational and right end views of a fastener post shown in FIG. 1.

FIGS. 4 and 5 are front perspective and left end views of the post.

FIGS. 6 and 7 are right perspective and right end views of a fastener clip shown in FIG. 1.

FIGS. 8 and 9 are cross-sectional views of the clip taken along the lines 8—8 and 9—9 of FIG. 7.

FIGS. 13–15 are generally sequential views illustration certain steps in assembling the fastener such as in connecting together the two members shown in phantom lines in FIG. 14.

FIG. 16 is a view taken along the line 16—16 of FIG. 13.

Figure 9:
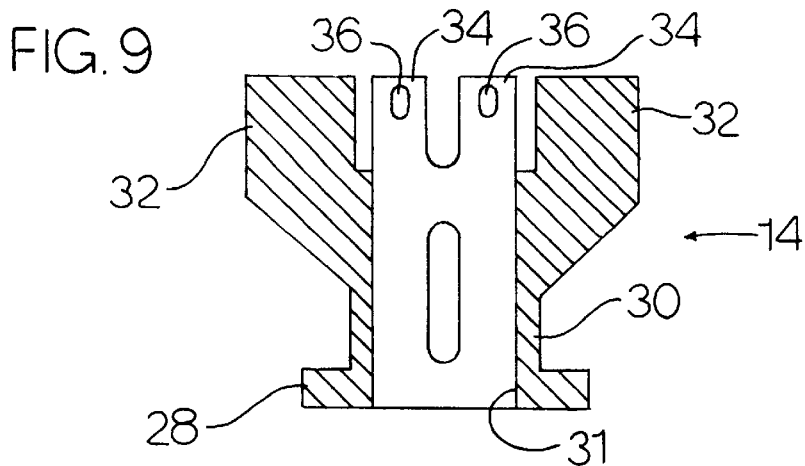

While the invention is susceptible of various modifications and alternative constructions, a certain illustrated embodiment has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE INVENTION

For purposes of illustration, the present invention is shown in the drawings as embodied in a fastener 10 (FIG. 1) adapted to releasably secure two of more members 42A, 42B (FIG. 14) together.

In general, the fastener 10 includes a fastener post 12 and a nut 14. The fastener post 12 (FIGS. 2–5) is formed with a head 16 and a shank 18 extending rearwardly therefrom. The nut 14 (FIGS. 6–9) includes a collar or shoulder 28 connected to the forward portion of a body section 30, and an opening 31 extending therethrough for slidably receiving the shank 18 of the fastener post 12. As further described below, the nut 14 is adapted to engage the shank of the fastener post to secure the members 42A, 42B together.

To this end, the members 42A, 42B are formed with openings that are adapted to be aligned with one another and that are sized to slidably receive the shank 18 of the fastener post 12, the shank being is sized such that the free end extends through and beyond the members 42A, 42B when the head 16 is in contacting relation with the members. This arrangement enables the members 42A, 42B to be secured between the head 16 of the fastener post 12 and the shoulder portion 28 of the nut 14, as generally shown in FIG. 14.

The fastener post 12 and nut 14 may be made from any suitable material, and in a preferred embodiment are molded from a resilient elastic material such as plastic or nylon for low cost and corrosion resistance.

In accordance with one aspect of the present invention, the fastener post 12 and nut 14 are uniquely adapted such that the nut may be located at any desired position along the post by simply inserting the free end of the post through the opening 31 of the nut, and sliding the nut axially or longitudinally along the post to that desired position. The fastener post and nut may then be secured together, with the nut at the desired position, by simply effecting relative rotation of the post and/or the nut through an angle of rotation of less than 360 degrees.

In carrying out this aspect of the invention, the shank 18 of the fastener post 12 is formed with external helical threads, and a slot 20 that (i) extends longitudinally from the free end of the shank toward the head 16, and (ii) interrupts the threaded section of the post, preferably to a depth equal to or greater than the minor or root diameter of the external threads. In further carrying out the invention, the nut 14 includes a tab portion 38 (FIGS. 7 and 8) that is sized to be slidably received in the slot 20, and that is formed with complimentary threads sized for threaded engagement with the threads on the shank of the post. In the embodiment shown, the threaded tab portion 38 is located on the inner diameter of the opening 31 and extends inwardly therefrom.

Figure 10:
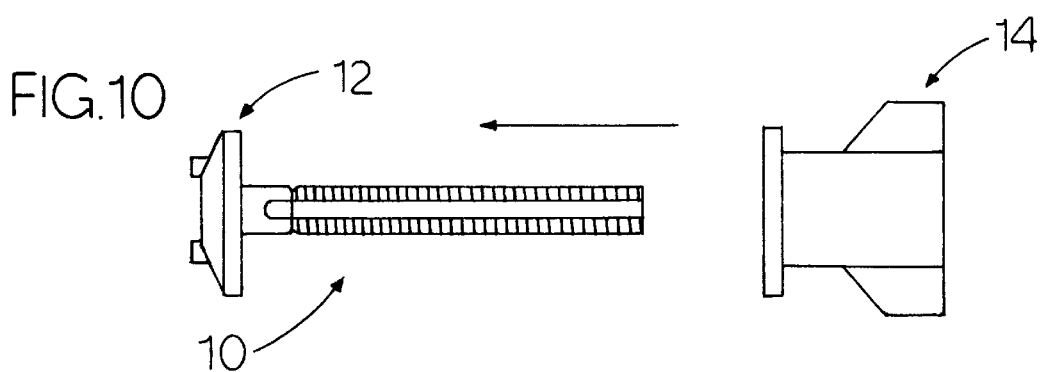
FIGS. 10 and 11 and are sequential views showing the clip being inserted onto the post.
Figure 11:
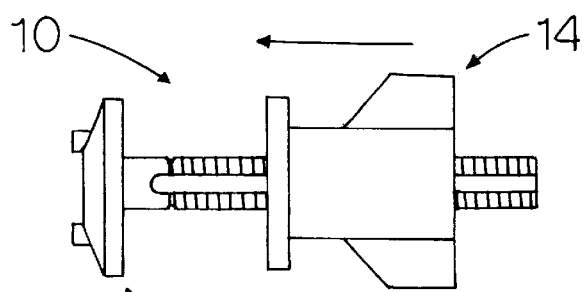
Figure 12:
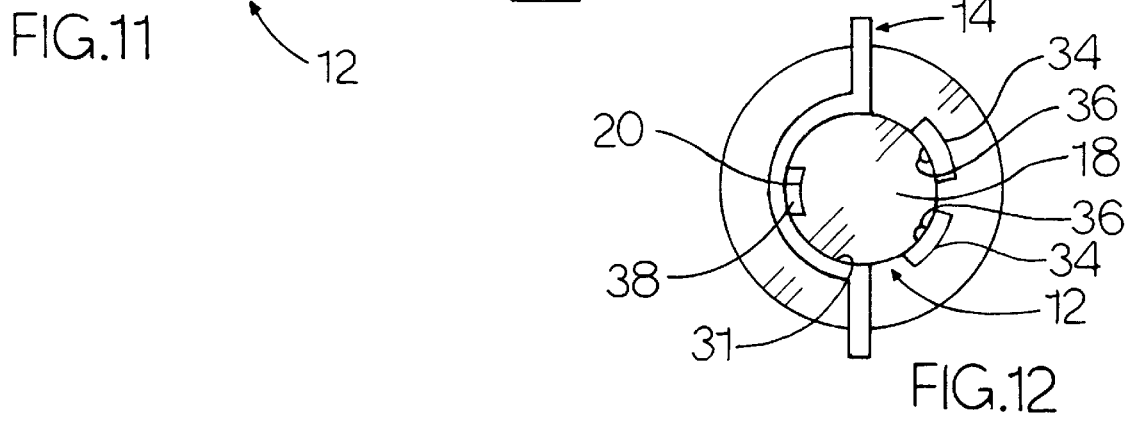
FIG. 12 is a right end view of the fastener as shown after the clip has been inserted onto the end of the post, but prior to engagement between the threads of the post and certain locking tabs.

With this arrangement, the nut 14 may be positioned and secured at any desired location on the post 12 by simply aligning the tab 38 with the slot 20 (FIG. 10), inserting the free end of the post through the opening 31 of the nut such that the tab 38 is positioned in the slot 20 (FIG. 12), and sliding the nut axially along the post (FIG. 11). The nut is then secured to the post at the desired location, such as to secure members 42A, 42B together, by simply turning the nut (FIGS. 13 and 14) on the post such that the threaded tab 38 is rotated into threaded engagement with the threaded shank 18 of the post. Such an arrangement enables the post 12 and nut 14 to be quickly and easily assembled together, and to quickly and easily secure the members 42A, 42B snugly between the head of the post and the nut. And removal of the nut from the post is accomplished by simply reversing the assembly steps.

To increase the axial movement of the nut toward the head of the fastener post 12 as the nut is rotated on the shank 18, such as to accommodate dimensional tolerance stack-ups between the members being connected together, or to insure that a desired preload is available between the fastener and such members, the threaded shank 18 and the threaded tab 38 may be optionally formed with, for example, a double helical threaded profile.

The nut according to the invention and described generally above is easily adapted for use with power tools, such as by forming a standard sized hex-shape for engagement with a power rotated socket wrench. Advantageously, the nut 14 shown includes wing members 32 that extend radially outwardly from the body section 30 to enable ease of manual assembly of the nut to the post 12. In this instance, the head 16 of the post may optionally be equipped with forwardly extending members 22 for ease of manually holding the post from rotating as the nut is rotated into threaded engagement with the shank 18. Alternately, for example, the threaded shank 18 may extend integrally from one of the members to be fastened as is a common technique for threaded studs.

In accordance with another aspect of the invention, the nut 14 is equipped with locking means adapted to automatically engage the shank 18 of the post 12 to prevent the nut from inadvertently rotating or backing off of the post. To this end, the threaded tab portion 38 may be configured to effect an interference or frictional fit with the threaded shank to lock the nut 14 onto the post 12. In the embodiment shown, the nut includes locking tabs 36 that are adapted for automatic engagement with the slot 20 after the nut has been rotated onto the post. In this instance, the locking tabs 36 extend radially inwardly from resilient lever sections that are angularly spaced from the threaded tab 38. The lever sections are configured to resiliently bias the locking tabs into the slot 20 when the locking tabs are aligned with the slot (FIG. 15) after the nut has been rotated into threaded engagement with the post 12. And although a locking tab positioned in the slot prevents inadvertent rotation of the nut such as from vibration of the members 42A, 42B and the fastener, the tabs 36 and resilient lever sections are adapted to deflect outwardly upon positive rotation of the nut with a pre-selected torque in the opposite direction such that the locking tabs disengage from the slot for intentional removal of the nut.

Advantageously, due to the resilient deflecting of the lever sections having the locking tabs 36, the locking performance of the fastener will not decrease after repeated removal and reuse of a nut and/or post due to wear, as is common with conventional interference-fit threaded arrangements. Moreover, the provision of more than one locking tab at multiple angular spacing enables the nut to be rotational secured onto the post at any of multiple angular positions corresponding to alignment between such spaced locking tabs and the slot 20.

In the event that the tightening or drawing down effect of turning the nut 14 on a helically threaded rod is not needed, such as when the members 42A, 42B are to be simply trapped together, other complimentary shoulder arrangement may be utilized to effect locking of the nut against rearward movement on the shank. In this instance, as with the helically threaded shank 18 and the threaded tab 38, the shank is formed with longitudinally spaced and forwardly facing shoulder portions that extend generally circumferentially around the shank but which are interrupted with the slot 20, and the tab portion is formed with rearwardly facing surfaces sized to co-act with the shoulders for rearward locking engagement when the tab portion is rotated out of alignment with the slot, and the locking tab 36 rotated into alignment with the slot 20. For illustrative purposes, such arrangements of complimentary shaped and spaced forwardly facing shoulders and rearwardly facing surfaces are shown in Bailet et al. U.S. Pat. No. 4,369,012, Hutchinson, U.S. Pat. No. 5,113,553, and Anderson, U.S. patent application Ser. No. 08/846,320. However, unlike these illustrative configurations, the slot (20) formed according to the present invention through the forwardly facing shoulders (such as of Anderson) enables the associated nut having a tab portion adapted to slide in the slot according to the present invention and equipped with rearwardly facing surfaces to simply slid freely onto the shank of the post to the desired position.

From the foregoing, it will be apparent that the present invention brings to the art a new and improved fastener 10. By virtue of the longitudinally extending slot 20 in the threaded shank 18 of the fastener post 12, and the threaded tab portion 38 that is (i) sized to slide in said slot, and (ii) configured for threaded engagement with the threads on the shank, the fastener can be quickly and easily assembled with the nut located at any position along the length of the threaded shank by simply slipping the nut onto and along the shank, and then turning the nut through a relatively small angle of rotation to effect engagement between the threaded shank and the threaded tab. The provision of resiliently biased locking tabs 36 provide for anti-rotation of the nut after it has been rotated to a predetermined angular position on the post, and the wings 32 provide easy manual rotation of the nut onto and off of the post.

We claim:

1. A fastener comprising:
    a threaded shank having a free end, said shank being formed with a slot extending in a longitudinal direction from said free end;
    a nut having an opening sized to slidably receive said threaded shank such that said nut is adapted to slip over said free end and longitudinally therefrom along said shank;
    a first tab connected to said nut, said tab being sized to be slidably received in said slot as said nut is slipped onto and along said shank in said longitudinal direction;
    said first tab being formed with threads that are complimentary to the threads formed on said shank such that the tab is rotated into threaded engagement with said shank as said nut is rotated after being slipped onto said shank; and
    a second tab connected to said nut for radial movement inwardly and outwardly from said shank, said second tab being angularly spaced from said first tab and being sized to be received into said slot as said nut is rotated for locking said nut rotationally on said shank.

2. A fastener as defined in claim 1 in which said second tab is resiliently connected to said nut for said radial movement, said tab being resiliently biased toward said shank for automatically locking said nut on said shank as said second tab is rotated into alignment with said slot.

3. A fastener as defined in claim 2 in which said nut includes a body portion having said opening formed therein and resilient lever means connected to said body portion, said first tab extending inwardly from the inside surface of said opening, and said second tab extending inwardly from said lever means.

4. A fastener as defined in claim 3 further comprising wing means connected to said nut to enable manual rotation of said nut on said shank.

5. A fastener comprising:
    shaft means having generally cylindrical surface means including generally circumferentially extending and longitudinally spaced and forwardly facing shoulder means, said shaft means further having slot means extending longitudinally along said surface means and interrupting said shoulder means;
    nut means;
    one of said nut means and said shaft means having an opening sized for radial clearing relation between said nut means and said shoulder means as the other of said nut means and said shaft means is inserted axially into said opening;
    tab means connected to said nut means and sized to be slidably received in said slot means as said shaft means and said nut means are positioned in said radial clearing relation;
    said tab means being formed with generally rearwardly facing surfaces that are (i) longitudinally spaced to permit relative rotation between said shaft means and said nut means when in said radial clearing relation, and (ii) sized for rearward locking engagement with said shoulder means after such relative rotation; and
    lock means connected to said nut means, said lock means being angularly spaced from said tab means and being adapted to co-act with said slot means for locking said shaft means and said nut means against relative rotation when said tab means is in said rearward locking engagement with said shoulder means.

6. A fastener as defined in claim 5 in which said shoulder means project radially outwardly from said shaft means, and said surfaces project radially inwardly toward the center of said nut means.

7. A fastener as defined in claim 6 in which said locking means is resiliently biased toward said shaft means for automatically engaging said slot means when said locking means is angularly aligned with said slot means.

8. A method of fastening comprising the steps of;
(A) providing
(i) shaft means having a first threaded portion and longitudinally extending slot means,
(ii) nut means having an opening sized to slidably receive said shaft means and having a second threaded portion, and
(iii) tab means resiliently connected to said nut means;
(B) inserting said shaft means into said opening until said first and second threaded portions are laterally aligned with one another;
(C) rotating said nut means through a first angle of less than 360 degrees to effect threaded engagement between said first and second threaded portions, said tab means being positioned for angular alignment with said slot means as said nut means is rotated through said first angle and being resiliently biased toward said shaft means when in said alignment with said slot means.

9. A method as defined in claim 8 in which said first and second threaded portions extend generally circumferentially through second and third angles, respectively, the second angle being less than 360 degree.

10. A method as defined in claim 9 in which the sum of said second and third angles is less than or equal to 360 degrees.

11. A method as defined in claim 8 in which one of said first and second threaded portions includes a first thread, and in which the other of said first and second threaded portions includes second and third and forth threads such that threaded engagement of said first thread may be effected alternately between said second and third threads or said third and fourth threads.

12. A method as defined in claim 8 in which said first threaded portion includes first and second threads, and in which said second threaded portion includes third and forth threads such that threaded engagement between said first and second portions may be effected from either of two alternate lateral positions between said first and second threaded portions.

* * * * *